(12) United States Patent
Lehmann

(10) Patent No.: US 9,440,723 B2
(45) Date of Patent: Sep. 13, 2016

(54) ARRANGEMENT FOR DETERMINING A FORCE ACTING ON A RUDDER

(71) Applicant: Becker Marine Systems GmbH & Co. KG, Hamburg (DE)

(72) Inventor: Dirk Lehmann, Winsen (DE)

(73) Assignee: Becker Marine Systems GmbH & Co. KG (DE)

( * ) Notice: Subject to any disclaimer, the term of this patent is extended or adjusted under 35 U.S.C. 154(b) by 12 days.

(21) Appl. No.: 14/101,702

(22) Filed: Dec. 10, 2013

(65) Prior Publication Data

US 2014/0136032 A1 May 15, 2014

Related U.S. Application Data

(62) Division of application No. 12/912,031, filed on Oct. 26, 2010, now Pat. No. 8,676,413.

(51) Int. Cl.
*B63H 21/21* (2006.01)
*G01L 5/22* (2006.01)
*B63H 25/04* (2006.01)
*B63H 25/00* (2006.01)

(52) U.S. Cl.
CPC .............. *B63H 21/21* (2013.01); *B63H 25/04* (2013.01); *G01L 5/22* (2013.01); *B63H 25/00* (2013.01)

(58) Field of Classification Search
CPC  B63H 25/04; B63H 25/38; B63H 2025/388; B63H 2025/063
USPC ........................................................ 701/21
See application file for complete search history.

(56) References Cited

U.S. PATENT DOCUMENTS

| 3,102,420 | A | | 9/1963 | Mason |
| 3,548,775 | A | | 12/1970 | Hammond |
| 6,026,759 | A | * | 2/2000 | Hazelett .................. B63B 39/06 114/126 |
| 6,371,038 | B1 | | 4/2002 | Beauchamp et al. |
| 6,678,589 | B2 | | 1/2004 | Robertson et al. |
| 7,036,445 | B2 | * | 5/2006 | Kaufmann ............ B63B 39/061 114/144 RE |
| 7,281,482 | B1 | | 10/2007 | Beauchamp et al. |
| 2003/0150366 | A1 | | 8/2003 | Kaufmann et al. |
| 2004/0163579 | A1 | | 8/2004 | Tomita et al. |

(Continued)

FOREIGN PATENT DOCUMENTS

| CA | 2510117 A1 | 12/2005 |
| DE | 706352 C | 5/1941 |

(Continued)

OTHER PUBLICATIONS

KR20080054923A_machine translation; Jung Jae Sang et al. Jun. 2008; entire doc.*

(Continued)

*Primary Examiner* — Jelani Smith
(74) *Attorney, Agent, or Firm* — Kelly & Kelley, LLP

(57) ABSTRACT

In order to reduce the switching hysteresis in a dynamic positioning system and/or an autopilot system for watercraft, an arrangement is provided for determining a force acting on a rudder for watercraft. This arrangement includes a processing unit, at least one measuring device for determining values of a physical quantity of a rudder, and means for transmitting the determined values of the physical quantity to the processing unit. The processing unit is configured to determine the force acting on the rudder on the basis of the determined values of the physical quantity.

14 Claims, 6 Drawing Sheets

(56) References Cited

U.S. PATENT DOCUMENTS

| | | | |
|---|---|---|---|
| 2005/0011427 A1* | 1/2005 | Schmitz | B63H 25/382 114/162 |
| 2005/0199168 A1 | 9/2005 | Mizutani | |
| 2006/0124043 A1 | 6/2006 | Tracht et al. | |
| 2006/0217012 A1* | 9/2006 | Mizutani | 440/61 S |
| 2007/0032142 A1 | 2/2007 | Mizuno et al. | |
| 2007/0244639 A1 | 10/2007 | Butterworth et al. | |
| 2008/0115713 A1 | 5/2008 | Mizutani | |
| 2008/0207070 A1 | 8/2008 | Van Gelder | |
| 2008/0278714 A1 | 11/2008 | Tomita et al. | |
| 2009/0076671 A1 | 3/2009 | Mizutani | |
| 2009/0114137 A1 | 5/2009 | Keuning | |

FOREIGN PATENT DOCUMENTS

| | | | |
|---|---|---|---|
| DE | 1144612 B | | 2/1963 |
| DE | 2342287 A1 | | 2/1975 |
| EP | 1923307 A2 | | 5/2008 |
| JP | S5833141 A | | 2/1983 |
| JP | S59160947 A | | 9/1984 |
| JP | S61247592 A | | 11/1986 |
| JP | S62279195 A | | 12/1987 |
| JP | H0664589 A | | 3/1994 |
| JP | 2006-137334 A | | 6/2006 |
| JP | 2006-297977 A | | 11/2006 |
| KR | 20080054923 A | * | 6/2008 |
| RU | 2216476 C2 | | 11/2003 |
| WO | 2006/058232 A1 | | 6/2006 |
| WO | 2007/016805 A1 | | 2/2007 |

OTHER PUBLICATIONS

B. Baumgarten, E. Müller; "Modellversuche mit Rotor—Rudern im Propellerstrahr"; Schiff & Hafen/Kommandobrücke; 1983; pp. 65-68.

* cited by examiner

ARRANGEMENT FOR DETERMINING A FORCE ACTING ON A RUDDER

FIELD OF THE INVENTION

The invention relates to an arrangement for determining a force acting on a rudder.

BACKGROUND OF THE INVENTION

It is fundamentally known that in the maritime area, many watercraft have autopilot systems. These are automatic control systems which are frequently configured to be software-based and computer-implemented and which hold the watercraft on a predefined course during the trip. Such autopilot systems normally have position reference sensors or other types of position determining devices such as, for example, GPS receivers, gyro compasses or similar. In addition, other parameters can be made available to the autopilot system, which can be determined and relayed, for example, by local measuring devices on the watercraft. In the present context, the term "watercraft" is to be understood as any vehicle which is intended for movement on or in the water (e.g. ships, mobile drilling rigs, etc.). The autopilot systems further normally comprise a control device which is configured to control the maneuvering system of a watercraft. Maneuvering systems, in particular in ships, can in particular comprise a combination of a propulsion unit, for example, a ship's propeller and a control unit, for example, a rudder system with an adjustable rudder. In such maneuvering systems, the autopilot systems are frequently configured in particular to control or adjust the rudder and can thus calculate the actual course of the watercraft on the basis of the parameters supplied to the autopilot system and the predefined algorithms.

Furthermore, dynamic positioning systems for watercraft are known from the prior art. These are generally computer-controlled systems for the automatic positioning of watercraft, in particular ships. Dynamic positioning can either be accomplished absolutely—i.e. the watercraft is held at a fixed point above the seabed—or relative to a moving object such as a ship or a submarine vehicle. Such dynamic positionings are frequently used in the offshore oil industry for drilling platforms or other offshore watercraft. However, ships, for example, cruise ships, are now increasingly being fitted with dynamic positioning systems. These systems can furthermore additionally include autopilot functions and can thus hold watercraft on a specific, predefined course. In principle, watercraft can also have a dynamic positioning system and in addition a separate autopilot system. Such dynamic positioning systems normally comprise, inter alia, position reference sensors or other types of position determining devices such as, for example, GPS receivers, gyro compasses or similar. These devices deliver watercraft position data to the dynamic positioning system. Other such devices can be motion sensors by which means, for example, the rolling or pitching of a ship can be determined. As well as an autopilot system a dynamic positioning system comprises a control device which is configured to control the maneuvering system on the basis of the parameters supplied to the dynamic positioning system and the algorithms stored therein. In this case the control of the maneuvering system is usually accomplished in such a manner that a predefined position should be held. In the case of maneuvering systems comprising both a rudder system and a propulsion unit, dynamic positioning systems are frequently capable of controlling both subsystems. Both the dynamic positioning systems and the autopilot systems for watercraft can be subsumed under the generic term automatic control systems for watercraft.

In addition, dynamic positioning systems normally further comprise at least one measuring device for determining measurement data of physical quantities of the watercraft or of physical quantities acting on the watercraft. Autopilot systems can also comprise such measuring devices. In this case, it is for example known to determine the wind strength acting on the ship with the aid of measuring devices configured as wind sensors. Alternatively or additionally, it is further known to determine the swell by means of suitable wind devices. In this respect, the at least one measuring device and the means for determining watercraft position data provide information for a central control device, for example, a computer, with reference to the position of the ship and the extent and direction of action of certain environmental forces which (can) influence the position of the watercraft. On the basis of these parameters and information on a desired course, a processing unit of the dynamic positioning system and/or of the autopilot system, which can be integrated in the control device, calculates on the basis of one or more predefined algorithms the necessary control parameters on which basis the control device relays control signals to the maneuvering system of the ship or the watercraft and thereby influences this accordingly. By this means the desired course of the watercraft can be held or the predefined position reached or held.

The maneuvering system of a watercraft can, for example, comprise a rudder system and a propulsion unit, in particular a propulsion propeller. The rudder system in turn generally comprises a rudder and a rudder adjusting device, in particular a steering engine. By controlling the adjusting device and the propulsion unit, the thrust and the rudder angle of the watercraft or of the maneuvering system can be varied and the direction of travel and speed of the watercraft thereby influenced.

It is now determined by known autopilot systems or dynamic positioning systems at a given time that the course or the position of the watercraft must be changed on the basis of the present watercraft position and measurement data, the maneuvering system is controlled and the drive power (thrust) and/or the rudder angle is altered, but frequently not at the optimal level. As a result, the course of the watercraft is frequently changed beyond the desired course or the desired position is not reached directly so that the craft must then be steered again in the opposite direction. In practice, this results in frequent controlling or adjustment of the rudder angle and possibly in a continuous change in the performance of the propulsion propeller within relatively short time intervals. This process is designated as "switching hysteresis" and has the result that the maneuvering system is excessively stressed or the desired course or the desired position is only set with a delay. In other words, this can lead to increased abrasion or increased wear of the maneuvering system and can have the result that the course taken by the ship is frequently not optimal. Furthermore, in the case of autopilot systems the required propulsion energy of the watercraft is increased due to the frequent rudder deflections.

SUMMARY OF THE INVENTION

It is therefore the object of the present invention to improve autopilot systems of watercraft and/or dynamic positioning systems in such a manner that the switching hysteresis is reduced. This object is solved with an arrangement for determining a force, in particular a lift force and/or resistance force, acting on a rudder, in particular spade rudders, for watercraft, in particular ships, comprising a processing unit, at least one measuring device for determining values of a physical quantity of a rudder, and means for transmitting the determined values of the physical quantity to the processing unit, wherein the processing unit is configured to determine the force acting on the rudder on the basis of the determined values of the physical quantity.

By measuring the values of a physical quantity related to the force acting on the rudder, the force acting on the rudder can be determined at any time. The measurement of the values of the physical quantity at the rudder is expediently carried out many times or at predefined, possibly recurring intervals. In particular, it is expedient to carry out the measurement continuously during the travel of the watercraft or whilst holding the watercraft at a predefined position. By means of the present arrangement, a specific quantity of the rudder, i.e. the force acting on the rudder, can be determined and relayed to a dynamic positioning system or an autopilot system which evaluate this rudder quantity together with the other parameters on the basis of a predefined algorithm and as a result are able to better determine the optimal magnitude of the change in the rudder angle or the optimal level of the power increase or reduction so that switching hysteresis is avoided or at least reduced.

The term "physical quantity" can in principle be any quantitatively determinable property of the rudder or the rudder system. It can either be measured directly by means of the at least one measuring device (measured quantity) or it can be deduced or calculated from the measured quantity measured by the measuring device. The calculation is expediently also made by means of the processing unit. However, the measuring device can itself also be configured to determine or calculate the physical quantity on the basis of the measured quantities. The processing unit can, for example, be a suitable computer or similar and can optionally also be part of a dynamic positioning system. In some cases, such quantities are also designated as "physical-technical quantities" or "technical quantities". Such terms are also covered by the present invention.

The means for relaying the determined or measured quantity from the measuring device to the processing unit can comprise any suitable means. In particular, this means can be a cable-bound or wireless data transmission. The measuring device is frequently expediently provided directly on the rudder, the processing unit normally being located outside the rudder system on board the watercraft. In this respect, for example, a cable can be run from the rudder to the processing unit and the measuring device can be provided with a corresponding receiver and the processing unit can be provided with a corresponding receiver. Likewise, suitable transmitters and receivers are expediently provided in the case of a wireless transmission.

The processing unit in turn comprises suitable algorithms with which the force acting on the rudder can be determined or calculated on the basis of one or more of the determined values of the physical quantity. In principle, this force can be any suitable force acting on the rudder. Preferably, the lift force of the rudder and/or the resistance force of the rudder are determined according to the invention. In the present context, the lift force in particular comprises the force of the dynamic buoyancy of the rudder. In general, such a force arises when a body (rudder) having a specific shape or position moves relative to a fluid (water). The force exerted by the fluid or the liquid on the body is usually broken down into two components: into the dynamic buoyancy acting transverse to the direction of flow or to the longitudinal axis of the watercraft and the frictional resistance (resistance force) acting along the direction of flow or the longitudinal axis of the watercraft. In marine engineering circles, the terms "lift force" and "resistance force" of the rudder are also frequently designated by their English terms "lift" and "drag". In particular, the magnitude of the lift force is crucial for the rudder action. The lift force is sometimes also designated as "lateral force" of the rudder.

If the actual magnitude of the buoyancy or the resistance of the rudder is known in each case, the rudder system or the drive system of the watercraft can be controlled more accurately on the basis of this by an autopilot system or a dynamic positioning system in order to achieve the desired course or the desired position. The relationship between buoyancy and resistance is shown schematically in FIG. 5, where $U_0$ designates the propeller flow of a propulsion propeller of a watercraft (not shown here) and 10 designates a rudder located within this flow. The rudder is twisted at an angle α with respect to the watercraft longitudinal direction 18 or the direction of the flow $U_0$. Normally the watercraft longitudinal direction 18 and the direction of flow are identical. The resulting lift force running perpendicular to the direction of flow or the watercraft longitudinal direction 18 is shown by the arrow 20, whereas the resistance force is depicted by the arrow 21 and runs in the watercraft longitudinal direction 18. The arrows 20, 21 are depicted as vectors and indicate both the magnitude and the direction of the respective force. A force resulting from the two aforesaid forces is depicted by the arrow 22. The relationship shown in FIG. 5 is particularly crucial for autopilot systems for watercraft since these substantially only adjust the rudder and normally do not act on the propulsion unit and consequently, the level of the lift force of the rudder is fundamentally crucial for calculating the rudder angle and the corresponding control. According to the present invention, autopilot systems can accordingly manage with substantially fewer and smaller rudder deflections with the result that the necessary propulsion energy of the watercraft can be saved considerably.

Preferred embodiments of the arrangement according to the invention are specified in the dependent claims.

In a preferred embodiment of the invention, the physical quantity is a bending stress and/or a torque. Alternatively to the bending stress, the bending moment acting on the rudder and causing the bending stress in the rudder can also be determined. Both the lift force and also the resistance force can readily be determined by calculation on the basis of the bending stress. This is also possible on the basis of the torsional force acting on the rudder, i.e. the torque. It is particularly preferable to determine both the bending stress and the torque in order to obtain the highest possible accuracy in the calculation of the forces acting on the rudder. The bending stress can be determined particularly advantageously in the case of spade rudders as a result of their type of clamping.

In particular, it is expedient that the at least one measuring device is configured to determine the bending stress acting on a rudder trunk and/or a rudder stock of the rudder and/or the torque acting on the rudder stock of the rudder. A rudder trunk is used in particular in spade rudders and consists of a hollow support which is guided from the watercraft body into the rudder, inside which the rudder stock is disposed and mounted. For this purpose it is further preferred that the at least one measuring device is disposed on the rudder trunk, in particular on the inner casing of the rudder trunk, and/or on the rudder stock, in particular on the outer casing of the rudder stock. The rudder trunk of a spade rudder is designed in such a manner that it absorbs the bending stress acting on the rudder and removes it into the watercraft body. In this respect, the measurement of the bending stress is particularly expedient there. The measurement of the torque on the rudder stock is also expedient since this forms the axis of rotation of the rudder.

In particular, it is preferred that the at least one measuring device is disposed in an upper region of the rudder trunk and/or the rudder stock facing the hull. The measuring device is preferably disposed in the upper half, particularly preferably in the upper third of the rudder stock or the rudder trunk. This is particularly advantageous because the bending is frequently greatest in this region and the aforesaid regions are furthermore most readily accessible for the attachment of a measuring device. In particular, these regions are frequently located inside the hull so that optionally cables or the like can be installed in a relatively simple manner.

In order to obtain a particularly high redundancy of the measurement or in particular in order to determine two physical quantities, in particular both the bending stress and also the torque, it is expedient to provide two measuring devices which are preferably provided on the rudder trunk and/or on the rudder stock. Furthermore, in this embodiment, the two measuring devices are preferably arranged offset with respect to one another by 80° to 100°, in particular substantially by 90°, in relation to the circumference of the cylindrical rudder trunk or the rudder stock. This offset arrangement of the two measuring devices with respect to one another is in particular identifiable in a cross-sectional view. It is advantageous in this case that the lift force and the resistance force of the rudder also act substantially orthogonally to one another so that in each case one measuring device can be provided to determine a physical quantity which forms the basis for determining respectively one of the aforesaid forces. In principle, however a measurement can also be made only on the rudder stock or only on the rudder trunk.

In principle, the measuring device can comprise any suitable measuring means known from the prior art. Particularly preferably the at least one measuring device comprises a strain gauge strip, optical measuring means and/or means for measuring vibration frequencies. By this means reliable measurement results can be obtained in a simple and cost-effective manner, on the basis of which the value of the physical quantity can be determined.

The object forming the basis of the invention is further solved by a method for determining a force acting on a rudder, in particular a spade rudder, for watercraft, in particular ships, wherein a value of a physical quantity of a rudder, in particular a torque and/or a bending stress is determined by means of at least one measuring device, wherein the at least one determined value is transmitted to a processing unit, and wherein a force acting on the rudder, in particular a lift force and/or a resistance force is determined by means of the processing unit on the basis of the determined at least one value. The measurement for the torque is preferably carried out on the rudder trunk of the rudder and that for the bending stress is carried out on the rudder stock and/or on the rudder trunk of the rudder. In particular, the method can be carried out using the previously described arrangement according to the invention.

It is furthermore expedient that two measuring devices each are provided on the rudder trunk and/or on the rudder stock, and that the lift force of the rudder is determined on the basis of the measured values of the one measuring device and the resistance force of the rudder is determined on the basis of the measured values of the other measuring device.

The object forming the basis of the invention is further solved by a dynamic positioning system for the automatic positioning of a watercraft, in particular a ship, comprising a rudder, in particular a spade rudder, an adjusting means, in particular a steering engine, for adjusting the rudder and a propulsion unit, in particular a propulsion propeller, comprising a control device for controlling the adjusting means and/or the propulsion propeller, means for determining watercraft position data, namely a watercraft position sensing apparatus, and at least one measuring device to determine measurement data of physical quantities acting on the watercraft or physical quantities of the watercraft. The control device is configured for controlling the adjusting means and/or the propulsion propeller on the basis of the watercraft position data and the measurement data. Furthermore, according to the invention the at least one measuring device is configured to determine rudder measurement data of a physical quantity of the rudder and the control device for its part is configured to take into account the rudder measurement data in regard to the controlling of the adjusting means and/or the propulsion propeller.

The object forming the basis of the invention is further solved by an autopilot system for the automatic course control of a watercraft, in particular a ship, comprising a rudder, in particular a spade rudder, and an adjusting means, in particular a steering engine, for adjusting the rudder, comprising a control device for controlling the adjusting means, means for determining watercraft position data, namely a watercraft position sensing apparatus, which is configured to transmit the watercraft position data to the control device and at least one measuring device to determine measurement data of physical quantities acting on the watercraft, wherein the at least one measuring device is configured to transmit the determined measurement data to the control device, wherein the control device is configured for controlling the adjusting means on the basis of the watercraft position data and the measurement data. Furthermore, according to the invention the at least one measuring device is configured to determine rudder measurement data of a physical quantity of the rudder and the control device is configured to take into account the rudder measurement data in regard to the controlling of the adjusting means.

In both systems means for determining watercraft position data transmit these to the control device. Likewise, the measurement data of the at least one measuring device are transmitted to the control device. The measured data can be measured values of the physical quantity of the rudder or values determined or calculated on the basis of the actually measured values of the measuring device. According to the invention, instead of the usual measurement data known from the prior art, rudder measurement data of a physical quantity acting on the rudder are now used for the first time. These rudder measurement data are also transmitted to the control device and are used to determine the automatic positioning or automatic course control of the watercraft, i.e. in particular on the basis of the rudder measurement data, the adjusting means and/or the propulsion propeller are controlled by the adjusting means and/or the propulsion propeller. Consequently, a substantially more accurate control of the maneuvering system of the watercraft can be accomplished by the systems according to the invention and the switching hysteresis can thus be reduced considerably. In the systems according to the invention, measurement data exclusively relating to the rudder are therefore used for the first time for the positioning and control of the watercraft.

The physical quantity of the rudder is preferably a bending stress and/or a torque.

Furthermore, the control device or optionally also a separate processing unit is configured to determine a force acting on the rudder, in particular the lift force and/or the resistance force, on the basis of the determined values of the physical quantity of the rudder. The force acting on the rudder is then used for positioning or course control and in particular for controlling the maneuvering system of the watercraft.

According to one of the previously described embodiments of the arrangement according to the invention, the at least one measuring device of the two systems can be configured to determine a force acting on a rudder. In particular, the entire, aforesaid arrangement according to the invention can be part of the dynamic positioning or autopilot system, wherein the function of the processing unit from the arrangement according to the invention can be taken over by the control device of the respective system. Alternatively, the processing unit can also be provided separately inside one of the two systems.

In a preferred embodiment of the systems, a further measuring device is provided, which is configured to determine watercraft propulsion measurement data in relation to the propulsion force of the watercraft, in particular the thrust. This is preferably provided on the drive shaft of the propulsion propeller of the watercraft. Furthermore, the control device is configured to take into account the watercraft propulsion measurement data in regard to the controlling of the adjusting means and/or the propulsion propeller. Consequently, in this embodiment, in addition to the rudder measurement data, the watercraft propulsion measurement data are used in controlling the maneuvering system of the watercraft or incorporated in the algorithm forming the basis of the control. This is particularly expedient because the thrust of the watercraft acts precisely against the resistance force of the rudder or is reduced by the resistance force of the rudder. In this respect, with the additional provision of the watercraft propulsion measurement data it is possible to obtain extensive information about the maneuvering system of the watercraft. In particular, on the basis of these data the control device can determine or calculate the net maneuvering force and use this for the process of controlling the maneuvering system. The relationship between these individual forces is illustrated by the diagram in FIG. 6. This diagram is based on the diagram in FIG. 5 wherein the thrust 23 acting against the resistance 21 is additionally indicated as a vector arrow. The net maneuvering force 24 can be determined from the net thrust 23*b* (=thrust−resistance) and the buoyancy 20. The relationship shown in FIG. 5 is particularly relevant in dynamic positioning systems since these are frequently configured both for controlling the rudder and also the propulsion unit.

The object forming the basis of the invention is further solved by a method for the dynamic positioning and/or for the automatic course control of a watercraft, in particular a ship, comprising the following steps:

a.) determining a value of at least one physical quantity of a rudder, in particular a spade rudder, of a watercraft, in particular a torque or a bending stress, b.) determining a force acting on the rudder, in particular the lift force and/or the resistance force on the basis of the determined value of the physical quantity of the rudder, c.) controlling an adjusting means for adjusting the rudder, in particular a steering engine, and/or a propulsion unit of the watercraft on the basis of the force determined in step b.) and optionally further watercraft position data and/or watercraft measurement data, and optionally d.) repeating steps a.) to c.).

The watercraft measurement data in this case are measurement data relating to other physical quantities acting on the watercraft, for example, wind strength, swell, etc. Expediently the individual process steps are continuously repeated during the trip of the watercraft. Consequently, the force acting on the rudder is determined continuously and in a repetitive manner, which leads to high-quality results in relation to an optimal positioning or course alignment of the watercraft. In particular, the method can be carried out with a dynamic positioning or autopilot system described previously according to the invention.

In a preferred embodiment of the method according to the invention, the propulsion force of the watercraft, in particular the thrust can further be determined. In this connection it is then expedient to determine both the lift force and the resistance force and determine a watercraft maneuvering force or a net maneuvering force of the watercraft on the basis of the aforesaid three forces, wherein the controlling in step c.) is carried out on the basis of the watercraft maneuvering force. By this means, the switching synthesis can be further reduced.

The object forming the basis of the invention is further solved by a rudder, in particular a spade rudder, for watercraft, in particular ships, comprising a rudder trunk and a rudder stock, wherein at least one measuring device is provided on the rudder trunk and/or on the rudder stock, which is configured to determine a physical quantity of the rudder, in particular a bending stress in the rudder trunk and/or in the rudder stock and/or a torque in the rudder stock. The rudder further comprises means for transmitting the determined values of the at least one measuring device to a data processing unit. The data processing unit can in particular be a computer and it can pertain to a dynamic positioning or autopilot system so that the measuring device of the rudder can be coupled to such a system. The values of the physical quantity can either be measured directly or they can be determined on the basis of the measured data by means of the measuring device or optionally a further processing or data processing unit. With such a rudder, additional information about the rudder forces or the rudder action can be transmitted to the aforesaid systems so that the control of the maneuvering system of the watercraft can take place more accurately and the switching synthesis can be reduced.

Finally, the object forming the basis of the invention can be solved by a computer program product, comprising a computer-readable storage medium or such a computer-readable storage medium itself, wherein a program is stored on the storage medium, which, after being loaded into the memory of the computer, enables a computer to carry out one of the previously described methods according to the invention, possibly in cooperation with an arrangement according to the invention, a dynamic positioning system according to the invention or an autopilot system according to the invention.

BRIEF DESCRIPTION OF THE DRAWINGS

The invention is explained in detail hereinafter with reference to various exemplary embodiments shown in the drawings. In the figures, schematically.

DETAILED DESCRIPTION OF THE PREFERRED EMBODIMENT

Figure 1:
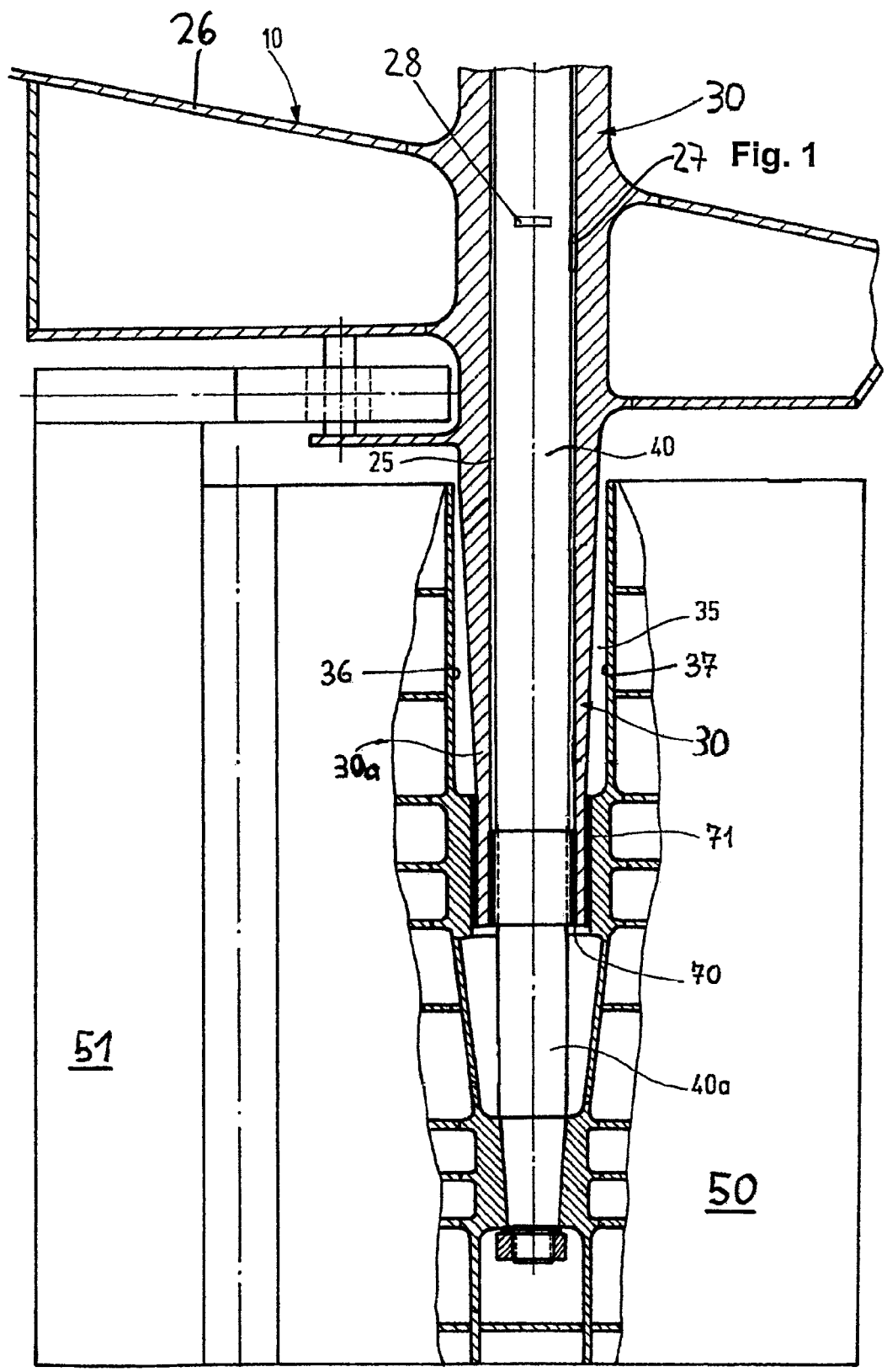
FIG. 1 shows a partially cutaway side view of a rudder with measuring devices for determining a torque and a bending stress.

FIG. 1 shows a side view of a rudder 10 comprising a rudder trunk 30, a rudder stock 40 and a rudder blade 50 with articulated fin 51. The trunk 30, the stock 40 and some partial regions of the rudder blade 50 are shown in a sectional view. In its upper region the rudder trunk 30 is firmly connected to the hull 26. The rudder trunk 30 further has an inner hole 25 which receives the rudder stock 40. The rudder trunk 30 is preferably inserted into a cylindrical cut-out 35 in the rudder blade 50 which receives the free end 30a of the rudder trunk 30. The cut-out 35 is delimited by a lateral planking 36, 37 of the rudder blade 50. The rudder stock 40 is connected to the rudder blade 50 with its end region 40a projecting from the rudder stock 30 and protruding into the rudder blade 50. Furthermore bearings 70, 71 are provided for mounting the stock 40 in the rudder trunk 30 or for mounting the rudder trunk 30 in the rudder blade 50. A measuring device 28 is provided on the surface of the rudder stock 40 in an upper region of the rudder stock 40 which is located inside the hull 26 and not yet in the rudder blade 50. The measuring device 28 is firmly mounted on the surface of the stock 40. This measuring device 28 comprises strain gauge strips. Another measuring device 27 is disposed on the inner casing or on the inner side of the rudder trunk 30 in the upper region of the rudder trunk 30 and in the vicinity of the measuring device 28. Such an arrangement of the measuring device 27, 28 has the advantage that this is still disposed inside the hull 26 and thus is relatively readily accessible and accordingly, cables or the like can be guided in a relatively uncomplicated manner to the measuring devices. Furthermore, the measuring devices 27, 28 are disposed in the region of the greatest bending of the rudder stock 40 or the rudder trunk 30 so that optimal measurement results can be achieved here. In principle, the measuring device 27 could also be arranged on the outer casing of the rudder trunk 30. The measuring device 27 also comprises a strain gauge strip. The measuring device 28 is configured to measure or determine the torque in the rudder stock 40 whilst the bending stress prevailing in the rudder trunk 30 can be determined by means of the measuring device 27. The measured or determined values are transmitted from both measuring devices 27, 28 to a processing unit (not shown here). For this purpose, transmitting or sending means (not shown here) suitable for wireless transmission of the data are provided in each measuring device 27, 28.

Figure 2:
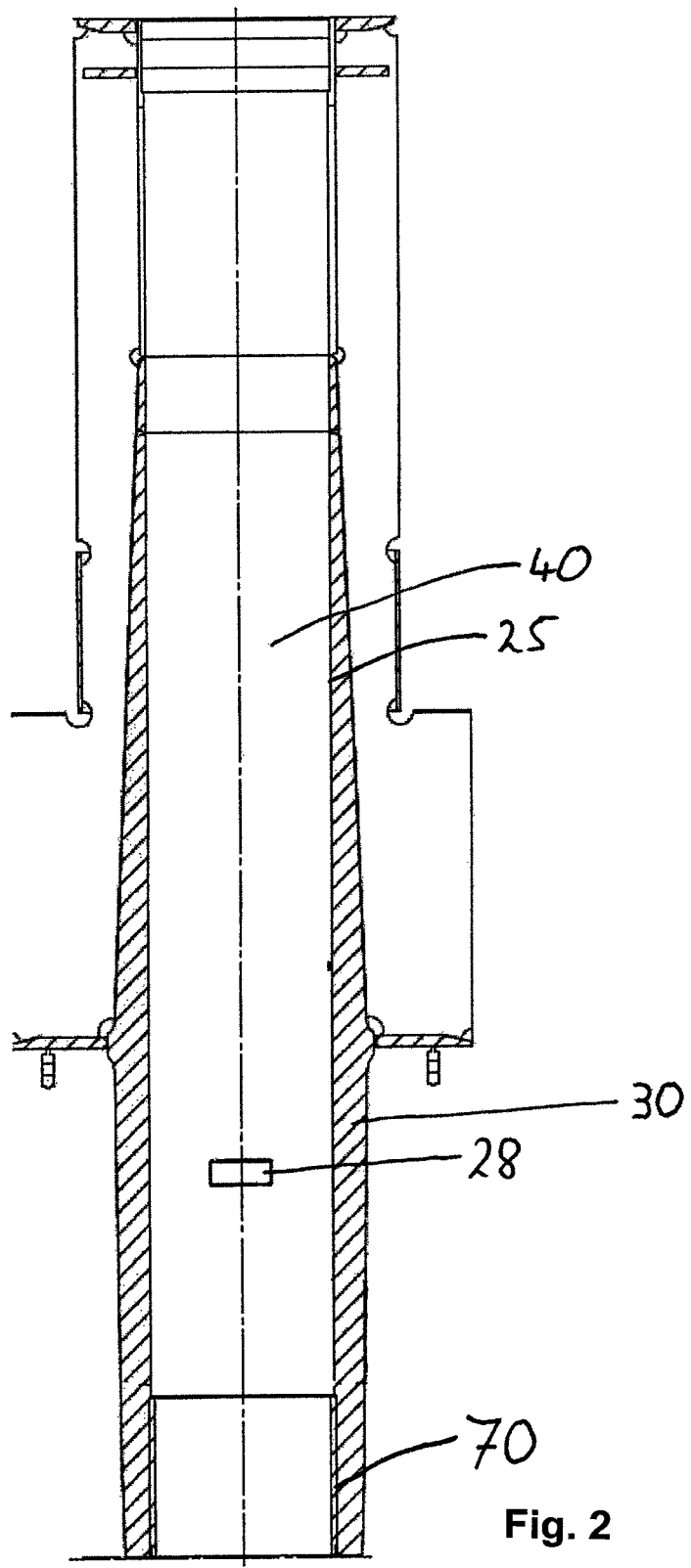
FIG. 2 shows a sectional view of a partial region of a rudder trunk and a rudder stock of a rudder with measuring devices for torque and bending stress.

FIG. 2 shows a partial region of a trunk 30 of a rudder stock 40 of a rudder mounted therein. In this diagram a measuring device 28 for determining the torque and/or the bending stress of the rudder stock 40 is also provided on the surface of the rudder stock. Another measuring device is not provided. Consequently, in the embodiment according to FIG. 2, the determination of the forces acting on the rudder is made only by a measuring device provided on the rudder stock 40 which is normally configured either to determine the torque or the bending stress. The measuring device 28 also has sending or transmitting means for transmitting data to a processing unit (not shown here).

Figure 3:
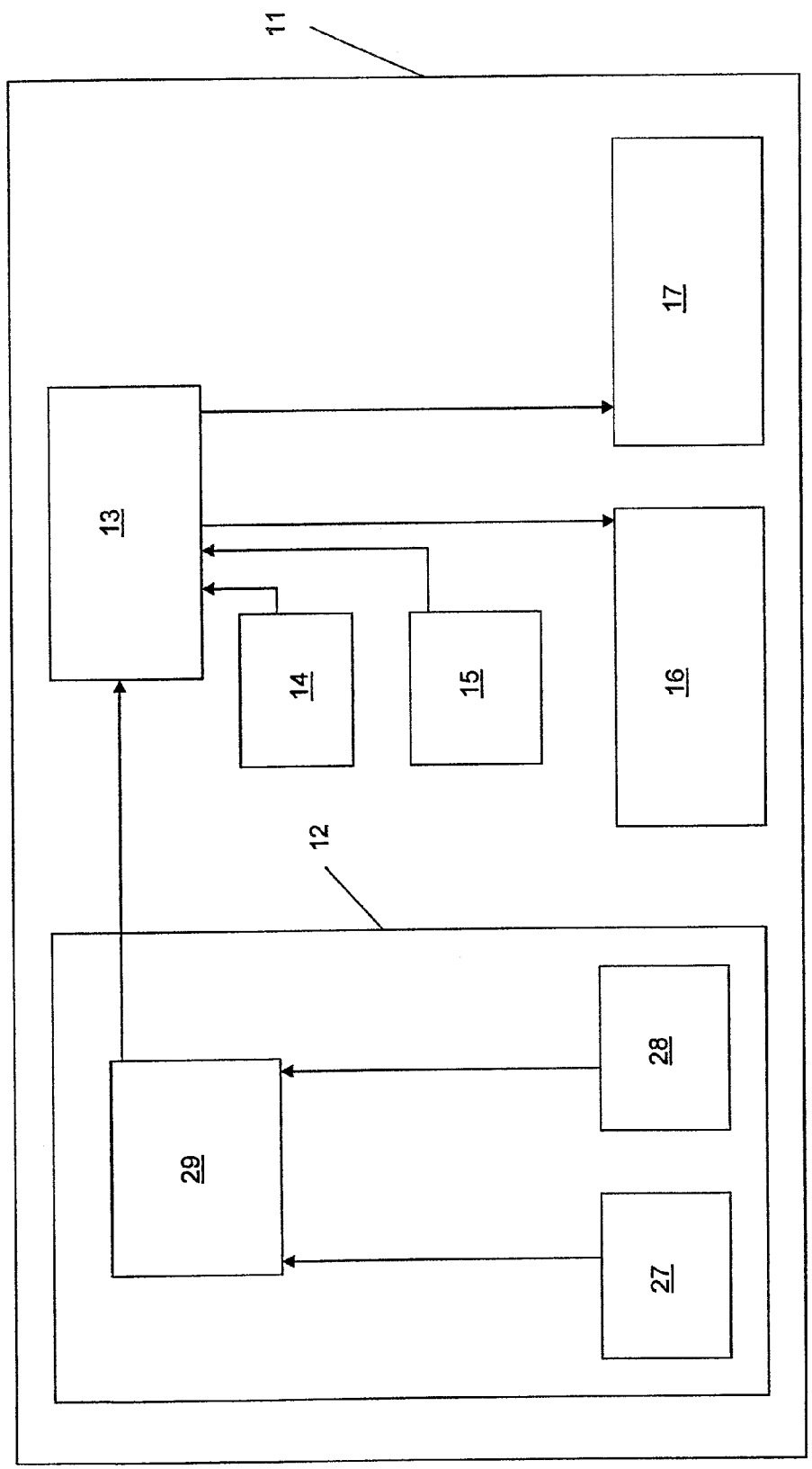
FIG. 3 shows a schematic view of a dynamic positioning system.

FIG. 3 shows a schematic diagram of a dynamic positioning system 11. This system 11 comprises an arrangement 12 for determining a force acting on a rudder. The measuring devices 27, 28 determine a bending stress or a torque on the rudder. The measured or determined data are transmitted from the measuring devices 27, 28 to a processing unit 29 which is located on board a ship (not shown here). On the basis of the determined values for the bending stress and the torque, the processing unit 29 calculates a lift force 20 and/or a resistance force 21 of the rudder 10 and transmits the values for this force to a control device 13 of the dynamic positioning system 11. In principle, the processing unit 29 can also initially determine the torque or the bending stress in a previous step on the basis of the measured values. The control device 13 then receives watercraft position data from a means configured as a GPS receiver to determine watercraft position data 14 and data from a wind measuring device 15 relating to the wind strength in the environs of the watercraft. Optionally, further measuring devices or means for determining watercraft position data can be connected to the control device 13 here. On the basis of the values or parameters transmitted to the control device 13, the control device 13 calculates on the basis of algorithms stored or predefined in the control device 13, which rudder angles or which propulsion force is optimal to achieve or maintain the desired positions which are also stored in the control device 13. In this calculation step, the lift force 20 and/or the resistance force 21 are also taken into account according to the invention. Based on the determined rudder angles or the determined power level, the control device 13 controls an adjusting device 16 for adjusting the rudder angle and/or a watercraft propulsion unit 17 for increasing or reducing the thrust of the watercraft. The previously described process is repeated continuously during operation of the watercraft in order to ensure that the watercraft remains continuously at the desired position.

Figure 4:
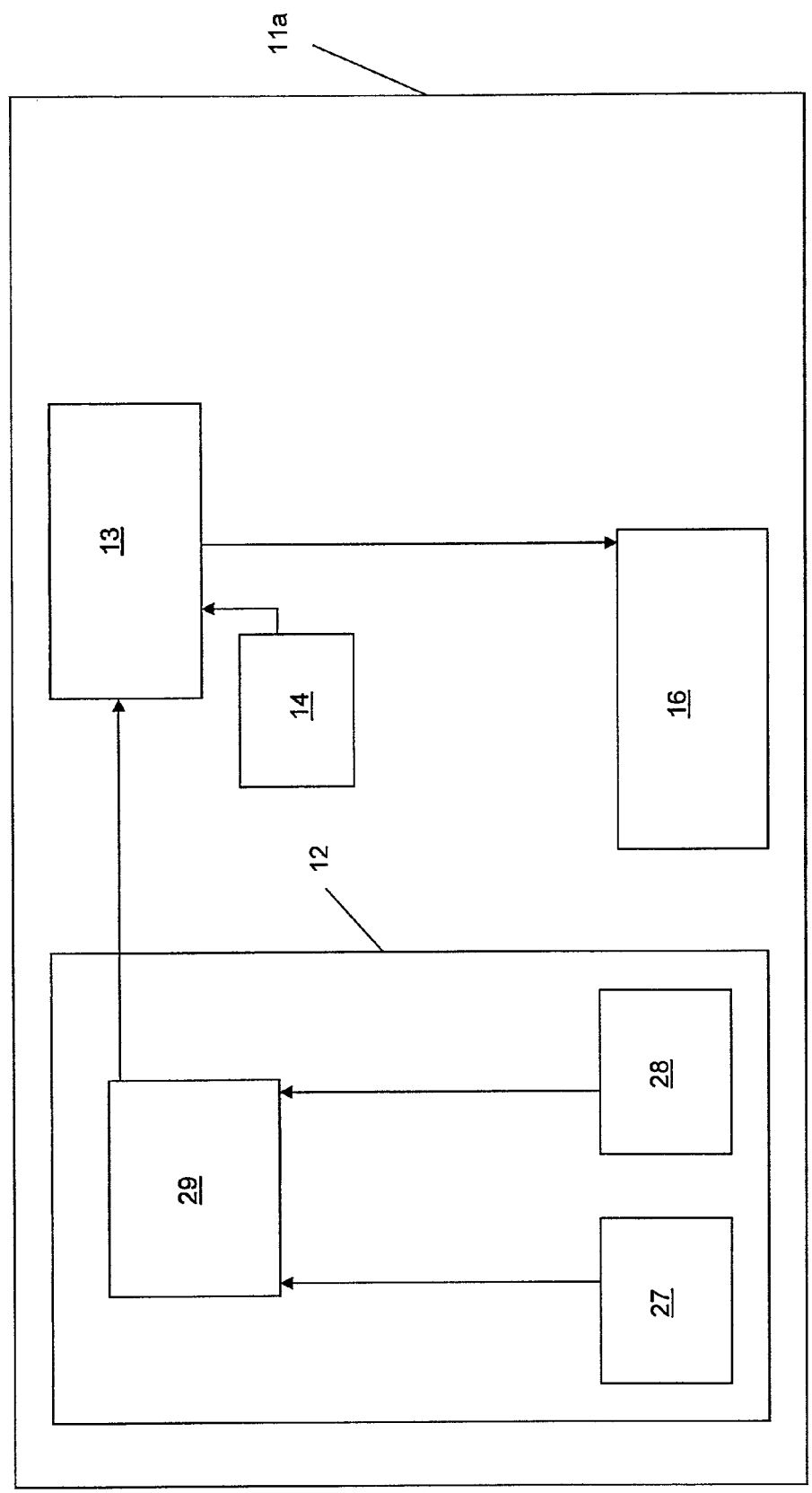
FIG. 4 shows a schematic view of an autopilot system.
Figure 5:
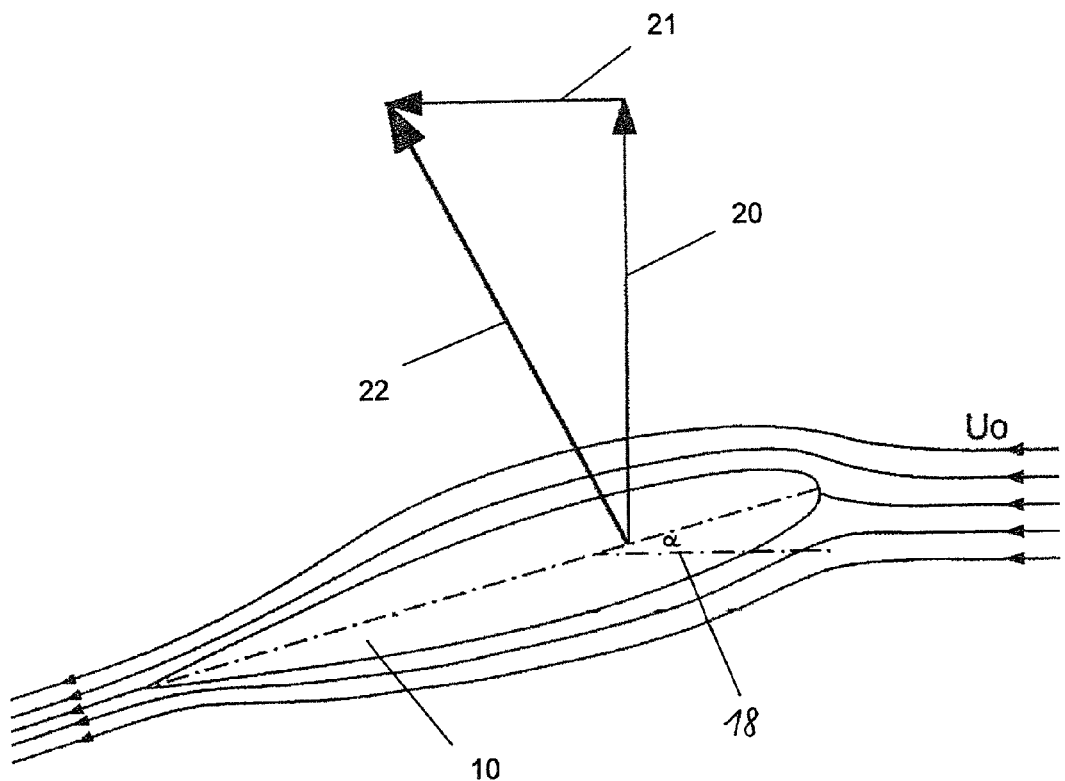
FIG. 5 shows a force vector diagram to illustrate the relationship between buoyancy and resistance and FIG. 6 shows the force vector diagram from FIG. 5 with thrust and net maneuvering force additionally indicated.
Figure 6:
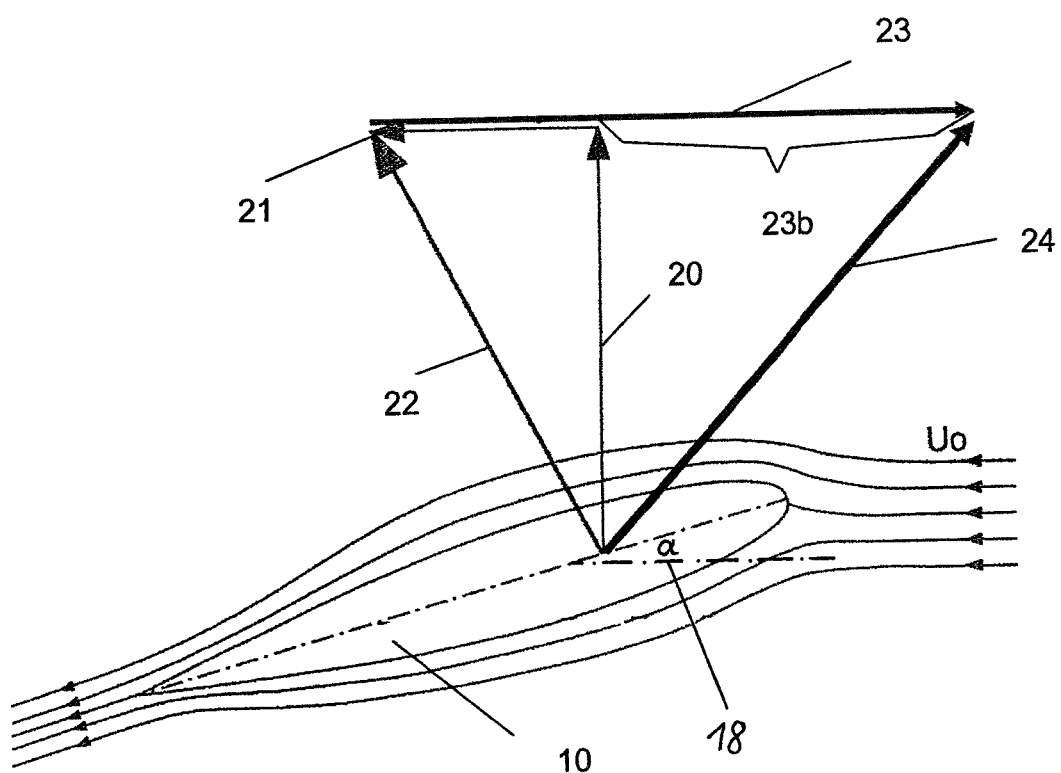

FIG. 4 shows a schematic diagram of an autopilot system 11a. This diagram or the autopilot system 11a substantially corresponds to the dynamic positioning system 11 shown in FIG. 3. Unlike the dynamic positioning system 11, the control device 13 of the autopilot system 11a only controls the adjusting means 16 for adjusting the rudder angle and not a water propulsion unit. In addition, no wind measuring device or the like is provided since such parameters only play a subordinate role for course control during travel of the watercraft.

REFERENCE LIST

10 Rudder
11 Dynamic positioning system
11a Autopilot system
12 Arrangement
13 Control device
14 Means for determining watercraft position data
15 Wind measuring device
16 Rudder adjusting device
17 Watercraft propulsion unit
18 Watercraft longitudinal direction
20 Lift force
21 Resistance force
22 Resultant force
23 Thrust
23b Net thrust 24 Net maneuvering force
Inner hole
26 Hull
27 Measuring device/trunk
28 Measuring device/stock
29 Processing unit
30 Rudder trunk
30a Lower rudder trunk end
35 Cut-out
36 Planking
37 Planking
40 Rudder stock
50 Rudder blade
51 Fin
70 Bearing
71 Bearing
$U_0$ Propeller flow
α Rudder angle

The invention claimed is:

1. A dynamic positioning system for automatic positioning of a watercraft, namely a ship, comprising:
   a rudder;
   a steering engine for adjusting the rudder;
   a propulsion unit disposed upstream of the rudder;
   a control device for controlling the steering engine or the propulsion unit;
   a watercraft position sensing apparatus configured to transmit watercraft position data to the control device; and
   at least one measuring device to determine measurement data of physical quantities acting on the watercraft;
   wherein the at least one measuring device is configured to transmit the determined measurement data to the control device, wherein the control device is configured for controlling the steering engine or the propulsion unit based on the watercraft position data and the measurement data, characterised in that the at least one measuring device is configured to determine rudder measurement data of a physical quantity of the rudder and that the control device is configured to take into account the rudder measurement data in regard to the controlling of the steering engine the propulsion unit.

2. An autopilot system for automatic course control of a watercraft, namely a ship, comprising:
   a rudder;
   a steering engine for adjusting the rudder;
   a control device for controlling the steering engine;
   a watercraft position sensing apparatus configured to transmit the watercraft position data to the control device; and
   a measuring device to determine measurement data of physical quantities acting on the watercraft;
   wherein the measuring device is configured to transmit the determined measurement data to the control device, wherein the control device is configured for controlling the steering engine based on the watercraft position data and the measurement data, wherein the measuring device is configured to determine rudder measurement data of a physical quantity of the rudder, and wherein the control device is configured to take into account the rudder measurement data in regard to the controlling of the steering engine.

3. The system according to either of claims 1 or 2, characterised in that the physical quantity of the rudder is a bending stress or a torque.

4. The system according to either of claims 1 or 2, characterised in that the control device is configured to determine a lift or a resistance force acting on the rudder, based on the rudder measurement data of the physical quantity of the rudder.

5. The system according to either of claims 1 or 2, characterised in that the at least one measuring device is configured to determine a bending stress acting on a rudder trunk and/or a rudder stock of a rudder and/or that the at least one measuring device is configured to determine a torque acting on a rudder stock of a rudder.

6. The system according to claim 5, wherein the at least one measuring device is disposed on the rudder trunk, in particular on an inner casing of the rudder trunk, and/or on the rudder stock, in particular on an outer casing of the rudder stock.

7. The system according to claim 6, wherein the at least one measuring device is disposed in an upper region of the rudder trunk and/or the rudder stock, preferably in an upper half, particularly preferably in an upper third.

8. The system according to claim 5, characterised in that the at least one measuring device comprises a strain gauge strip, optical measuring means, and/or means for measuring vibration frequencies.

9. The system according to claim 6, characterised in that two measuring devices are provided on the rudder trunk and/or on the rudder stock, wherein the measuring devices are arranged offset with respect to one another by 80° to 100°, in particular substantially by 90°, in relation to a circumference of the rudder trunk or the rudder stock.

10. The system according to either claims 1 or 2, characterised in that a further measuring device is provided, which is configured to determine watercraft propulsion measurement data in relation to a propulsion force of the watercraft, in particular a thrust, and which is provided on the propulsion unit, in particular on a drive shaft of a propulsion propeller, wherein the control device is configured to take into account the watercraft propulsion measurement data in regard to the controlling of the steering engine or the propulsion unit.

11. A method for dynamic positioning for automatic course control of a watercraft, namely a ship, comprising the following steps:
   a.) determining a value of at least one physical quantity, in particular a torque or a bending stress, of a rudder of the watercraft;
   b.) determining a lift force or a resistance force acting on the rudder, on the basis of the determined value of the physical quantity of the rudder; and
   c.) adjusting the rudder by way a steering engine or a propulsion unit of the watercraft based on the lift force determined in step b.) and, optionally, further watercraft position data or watercraft measurement data
   further characterised in that a propulsion force of the watercraft, in particular a thrust, is determined, that the lift force and the resistance force are determined in step b.), and that a watercraft maneuvering force is determined based on the aforesaid forces,
   wherein the controlling in step c.) is carried out based on the determined watercraft maneuvering force.

12. The method according to claim 11, characterised in that the force acting on the rudder is determined continuously during operation of the watercraft.

13. A computer program product, comprising a computer-readable storage medium on which a program is stored, which, after being loaded into a memory of a computer, enables the computer to carry out a method according to claim 11.

14. A computer-readable storage medium on which a program is stored, which, after being loaded into a memory of a computer, enables the computer to carry out a method according to claim 11.

\* \* \* \* \*